June 10, 1930.    I. H. KENDALL    1,762,820
CONNECTED PIPE SYSTEM AND METHOD OF MAKING THE SAME
Filed April 16, 1928
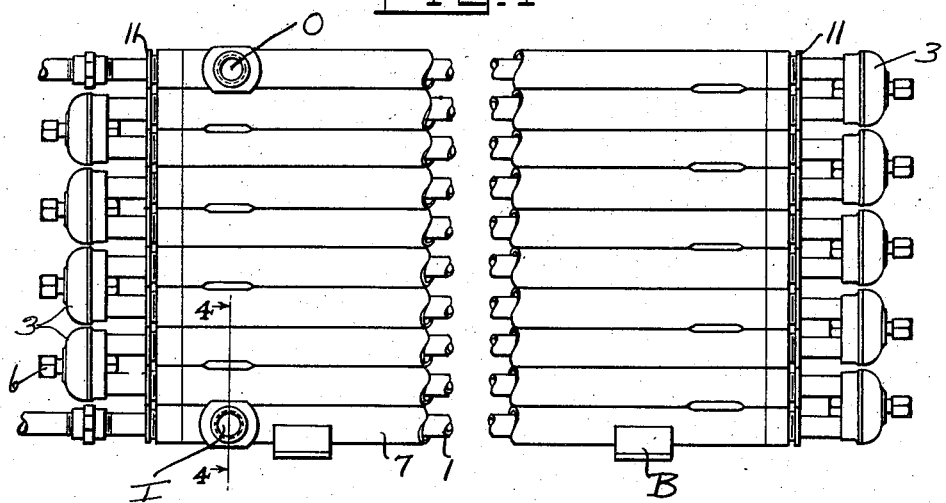
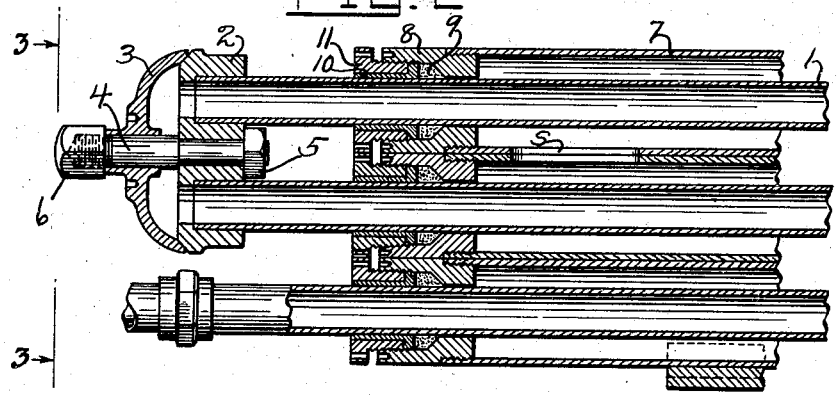
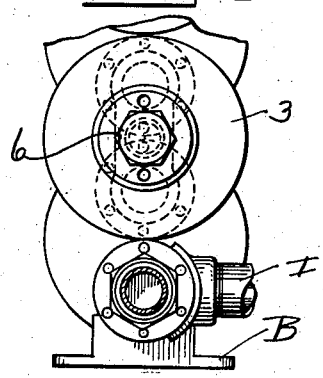
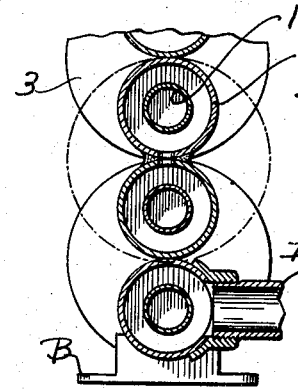
INVENTOR
Ira H. Kendall
BY Mock & Blum
ATTORNEYS Patented June 10, 1930

1,762,820

UNITED STATES PATENT OFFICE

IRA H. KENDALL, OF POTSDAM, NEW YORK, ASSIGNOR TO THE KENDALL PATENTS, INC., OF POTSDAM, NEW YORK, A CORPORATION OF NEW YORK

CONNECTED PIPE SYSTEM AND METHOD OF MAKING THE SAME

Application filed April 16, 1928. Serial No. 270,504.

My invention relates to a new and improved connected pipe system and a method of making the same.

One of the objects of my invention is to provide a new and improved pipe system through which any suitable liquid can be forced for the purpose of heating the same, cooling the same, or treating it in any other manner.

Another object of my invention is to provide an improved pipe system which shall be especially applicable for apparatus used in the dairy industry, as for example, apparatus used for heating milk, cooling milk or the like.

Another object of my invention is to provide a connected pipe system which can be very simply manufactured, and at a minimum cost.

Other objects of my invention will be set forth in the following description and drawings which illustrate a preferred embodiment thereof, it being understood that the above general statement of the objects of my invention is intended to generally explain the same and not to limit it in any manner.

Fig. 1 is a side elevation.

Fig. 2 is a central vertical sectional view.

Fig. 3 is a view on the line 3—3 of Fig. 2.

Fig. 4 is a sectional view on the line 4—4 of Fig. 1.

Hitherto in heating or cooling milk for example, it has been necessary to force the milk to be treated through a connected pipe system composed of a number of individual pipes suitably coupled, and to locate these pipes which may be designated as the first series, within a second series of pipes through which the heating or cooling water or the like was caused to travel. Combination pipe systems of this kind have heretofore been expensive to manufacture and install.

According to my invention the milk or the like is forced through a series of primary pipes 1 which may be designated as the first system. The pipes 1 are arranged in pairs, as clearly shown in Fig. 2. Each pair of pipes 1 is provided with a coupling head 2 made of any suitable metal, which can be soldered or connected in any suitable liquid tight manner to the associated pair of pipes 1, without requiring the use of any packing material. The outer end of each coupling head 2 is ground so as to present a smooth conical surface. The coupling 3 has a correspondingly shaped round surface so that if this is forced with sufficient pressure against the coupling head 2 a liquid tight joint is produced without the necessity of using unsanitary packing materials. A bolt 4 having a head 5 is connected to the members 2 and 3 in any suitable liquid tight manner, and a nut 6 is employed for forcing the member 3 into the position shown in Fig. 2. The head 5 of the bolt is preferably in the form of a nut which can be readily unscrewed from the said bolt 4, so that the parts can be easily assembled. Liquid tight joints can be secured without the use of packing materials, by means of solder or any other suitable means.

The pipes 1 (of the first series) are located within a series of pipes 7 which may be designated as the pipes of the second series. As clearly shown in Figs. 2 and 4, the pipes 7 abut each other and they are provided with longitudinal slits S, the longitudinal slits S of two adjacent pipes 7 registering with each other so as to cause the pipes 7 to form a continuous intercommunicating secondary pipe system. As shown in Fig. 4 for example, a liquid tight joint is produced at the slits S, by means of electric welding, namely, by using an electrode which is melted by an electric arc so that a metal seal M is deposited around the edges of the openings S, to form a liquid tight joint. In Fig. 2, the respective openings S of two adjacent pipes 7 are shown as being of exactly the same size. However, it would not be departing from my invention if the top slit S of each pair were made a little larger than the adjacent bottom opening, to facilitate a rapid application of the welding arc. It will be noted that the slits S are long and narrow and the edges of these slits are not pressed out to form flanges so that the edges of said slits may be considered as being composed of discontinuous straight-line elements on the outer surfaces of said tubes. Likewise, since the edges of the slits are free from projecting flanges, it is possible to have the connected tubes abut each other so that a firm and strong structure can be built up. Due to the fact that the length of a slit is greater than its width and since the walls of adjacent tubes abut each other, it is difficult to apply the molten metal in order to effectively connect the slits to each other in a leak-tight manner.

It is particularly desirable, therefore, to have the top slit of each pair a little larger than the adjacent slit as this makes it possible to effectively and quickly use electric welding.

The ends of the secondary pipes 7 may be closed in any suitable manner. For example, and as shown in Fig. 2, the said pipes 7 may be provided with packing heads 8, adapted to receive rings of packing material 9, said rings of packing material 9 being compressed by means of followers 10 which are actuated by nuts 11. Generally speaking, any suitable form of packing gland may be employed for closing the ends of the secondary pipes 7. Since the primary pipes 1 fit snugly within the followers 10, and since they are firmly held in position within the packing glands of the secondary pipes 7, the primary pipes 1 are firmly held within the secondary pipes 7. Likewise, since the secondary pipes 7 are firmly connected by the electric welding, all the pipes form a firmly assembled unit so that it is not necessary to enclose them within any supporting frames or the like. It is merely necessary to provide the bottom secondary pipe 7 with base members B of any suitable type, in order to firmly hold the assembly in the vertical position illustrated in Fig. 1. Any number of pipes may be assembled to form a convenient unit, and the entire heating or cooling system may comprise a plurality of such assemblies arranged in any suitable manner. For example, the bottom pipe 7 may have a water inlet I and the top pipe may have a water outlet O. However, it is well known to arrange a series of such pipes with a plurality of water inlets and water outlets and this could be done in any suitable manner without departing from my invention.

I have described a preferred embodiment of my invention, but it is clear that numerous changes and omissions could be made without departing from its spirit.

For example, the nuts 11 are provided with longitudinal openings adjacent the peripheries thereof by means of which the said nuts 11 may be manipulated to insert them or remove them, but any other suitable means may be provided for manipulating the said nuts 11. Likewise, it may be desirable to have adjacent nuts 11 slightly spaced from each other so that they can be readily turned.

I claim:

1. A method of connecting a pair of pipes having slits therein, which consists in placing said slits in alignment and causing said tubes to abut each other, and forming a liquid tight joint at the edges of the said slits by melting a layer of liquid tight material directly at the peripheries of the said slits, and causing said material to solidify.

2. A pair of pipes having aligned slits in the walls thereof, said pipes having an intermediate layer of solidified material deposited at the peripheries of the said slits to form a liquid tight closure, said tubes abutting each other and said slots being free from projecting flanges.

3. A pipe system comprising a plurality of pairs of primary pipes coupled at the ends thereof, each of said primary pipes passing through a secondary pipe of greater diameter, closure means provided at the ends of the secondary pipes, said primary pipes passing through said closure means and being held in position relative to said secondary pipes by said closure means, the secondary pipes being arranged in abutting pairs having aligned slits in their walls intermediate the ends thereof, the edges of said slits being connected by a deposited film of metal to form a liquid tight closure.

4. A pipe system comprising a plurality of pairs of primary pipes coupled at the ends thereof, each of said primary pipes passing through a secondary pipe of greater diameter, closure means provided at the ends of the secondary pipes, said primary pipes passing through said closure means and being held in position relative to said secondary pipes by said closure means, the secondary pipes being arranged in pairs having aligned slits in their walls intermediate the ends thereof, the edges of said slits being connected by a deposited film of metal to form a liquid tight closure, the said slits being free from projecting flanges and said secondary pipes abutting each other.

In testimony whereof I affix my signature.

IRA H. KENDALL.